(12) United States Patent
McCleland et al.

(10) Patent No.: US 9,059,906 B1
(45) Date of Patent: Jun. 16, 2015

(54) DATA COMMUNICATION INTERFACE

(71) Applicants: Barry John McCleland, Southlake, TX (US); Eugene Christiaan van Beljon, Grapevine, TX (US)

(72) Inventors: Barry John McCleland, Southlake, TX (US); Eugene Christiaan van Beljon, Grapevine, TX (US)

( * ) Notice: Subject to any disclaimer, the term of this patent is extended or adjusted under 35 U.S.C. 154(b) by 0 days.

(21) Appl. No.: 14/095,417

(22) Filed: Dec. 3, 2013

(51) Int. Cl.
  *H02J 1/00* (2006.01)
  *H04L 12/26* (2006.01)
  *H04L 29/06* (2006.01)

(52) U.S. Cl.
  CPC ........... *H04L 43/08* (2013.01); *H04L 69/18* (2013.01)

(58) Field of Classification Search
  CPC ............ H02J 1/00; H02J 3/00; H04B 3/54
  USPC ................................ 307/1; 710/8; 709/203
  See application file for complete search history.

(56) References Cited

U.S. PATENT DOCUMENTS

| | | | | |
|---|---|---|---|---|
| 5,307,463 | A * | 4/1994 | Hyatt et al. | 710/1 |
| 6,377,808 | B1 * | 4/2002 | Korneluk et al. | 455/445 |
| 7,446,430 | B2 * | 11/2008 | Leung et al. | 307/38 |
| 7,627,704 | B2 * | 12/2009 | Croyle et al. | 710/105 |
| 2004/0150264 | A1 * | 8/2004 | Kudo et al. | 307/9.1 |
| 2006/0097572 | A1 * | 5/2006 | Drouin et al. | 307/1 |
| 2011/0158283 | A1 | 6/2011 | Meyerson et al. | |
| 2012/0019351 | A1 * | 1/2012 | Bougaev et al. | 340/3.5 |
| 2013/0182745 | A1 | 7/2013 | Hertel et al. | |

OTHER PUBLICATIONS

USB-I2C ISB to I2C Communications Module, Oct. 10, 2011.*

* cited by examiner

*Primary Examiner* — Rexford Barnie
*Assistant Examiner* — Joseph Inge
(74) *Attorney, Agent, or Firm* — Ohlandt, Greeley, Ruggiero & Perle, L.L.P.

(57) ABSTRACT

Embodiments of the invention provide a data communication interface which includes a controller module, a switching module and a data port. The controller module is operable to monitor a status of a power line of the data port and, if the power line has a first status, to transmit a first communication mode instruction to the switching module. If the power line has a second status, the controller module is configured to transmit a second communication mode instruction to the switching module. The switching module is configured to receive a communication mode instruction from the controller module and, if the first communication mode instruction is received, to route data communication lines corresponding to a first communication protocol to the data port. If the second communication mode instruction is received, the switching module is configured to route data communication lines corresponding to a second communication protocol to the data port.

19 Claims, 8 Drawing Sheets

DATA COMMUNICATION INTERFACE

FIELD OF THE INVENTION

This invention relates to a data communication interface which may be operable to communicate using different communication protocols.

BACKGROUND TO THE INVENTION

There are currently a variety of different communication standards. Each communication standard may involve its own communication protocol, as well as communication connectors, sockets and/or ports, cables and the like. A communication standard is typically chosen so as to meet certain criteria. For example, data rate, number of devices to be connected, power consumption, or simplicity may be criteria on which a communication standard is chosen. The communication protocol of a particular communication standard may define formats for exchanging messages. For example, the universal serial bus (USB) defines a specific communication protocol and corresponding communication ports and connectors which are typically used in conjunction therewith.

It may be desirable to implement more than one communication protocol using a common connector.

SUMMARY OF THE INVENTION

In accordance with a first aspect of the invention there is provided a data communication interface, the data communication interface comprising a controller module, a switching module and a data port, wherein:

the controller module is operable to monitor a status of a power line of the data port and, if the power line has a first status, transmitting a first communication mode instruction to the switching module and, if the power line has a second status, transmitting a second communication mode instruction to the switching module;

the switching module is configured to receive a communication mode instruction from the controller module and, if the first communication mode instruction is received, route data communication lines corresponding to a first communication protocol to the data port; or, if the second communication mode instruction is received, route data communication lines corresponding to a second communication protocol to the data port.

In one embodiment of the invention, monitoring the status of the power line monitors a voltage of the power line; wherein the power line has a first status if the voltage is less than a first predetermined threshold and the power line has a second status if the voltage is greater than a second predetermined threshold.

Further features of the invention provide for the first predetermined threshold to be a lower threshold of an operating voltage of the first communication protocol and for the second predetermined threshold to be an operating voltage of the second communication protocol; the first and second predetermined thresholds are the same between a lower threshold of an operating voltage of the first communication protocol and an operating voltage of the second communication protocol; for the lower threshold of the operating voltage of the first communication protocol to be about 2.8 V; for the operating voltage of the second communication protocol to be about 5 V; for an increase in voltage on the power line to correspond to a connection of a powered device to the data port; for a decrease in voltage on the power line to correspond to a removal of the powered device from the data port.

Further features of the invention provide for, if the power line has a first status and the switching module routes data communication lines corresponding to a first communication protocol, the power line of the data port is configured to supply power to an external device; and if the power line has a second status and the switching module routes data communication lines corresponding to a second communication protocol, the power line of the data port is configured to receive power from an external device.

Further features of the invention provide for, if the power line has a second status and the switching module routes data communication lines corresponding to a second communication protocol to the data port, the data communication lines are not used and only power is received via the data port.

Further features of the invention provide for, if the power line is configured to receive power from an external device, using the received power to power and/or charge a power source of a host of the data communication interface.

Further features of the invention provide for the first communication mode instruction to be a logic high and for the second communication mode instruction to be a logic low or for the first communication mode instruction to be a logic low and for the second communication mode instruction to be a logic high; for the switching module to be a multiplexer; for the switching module to include a 4-to-2 multiplexer; for the switching module to include two 2-to-1 multiplexers.

Still further features of the invention provide for the data communication lines corresponding to the first communication protocol to be inter-integrated circuit (I2C) or system management bus (SMBus) data communication lines; for the I2C or SMBus data communication lines to include a serial data line and a serial clock line; for the I2C or SMBus data communication lines to include an additional line; for the additional line to be an interrupt line; for the I2C or SMBus data communication lines to include a positive power line for providing electrical power to an external peripheral device; for the I2C or SMBus data communication lines to include a negative power line for providing electrical power to an external peripheral device.

Yet further features of the invention provide for the data communication lines corresponding to the second communication protocol to be universal serial bus (USB) data communication lines; for the USB data communication lines to be data plus (D+) and data minus (D−) lines; for the USB data communication lines to include an additional line; for the additional line to be an identifier (ID) line; for the USB data communication lines to include a positive power line for receiving power from an external powered device; for the USB data communication lines to include a negative power line for receiving power from an external powered device.

Further features of the invention provide for the data port to include four wires; for the wires to include a power line, two data lines, and a ground line; for the data port to include an additional interrupt line or ID line; for the two data lines to be in electrical communication with the serial data line and the serial clock line when the switching module is in the first communication mode; for the two data lines to be in electrical communication with the data plus line and the data minus line when the switching module is in the second communication mode.

Further features of the invention provide for the switching module has a default setting to route data communication lines corresponding to the first communication protocol to the data port.

In accordance with another aspect of the invention, there is provided a monitoring device having one or more sensors associated therewith for monitoring one or more parameters, the monitoring device having a data communication interface comprising a controller module, a switching module and a data port, wherein:

the controller module is operable to monitor a status of a power line of the data port and, if the power line has a first status, transmitting a first communication mode instruction to the switching module and, if the power line has a second status, transmitting a second communication mode instruction to the switching module;

the switching module is configured to receive a communication mode instruction from the controller module and, if the first communication mode instruction is received, route data communication lines corresponding to a first communication protocol to the data port; or, if the second communication mode instruction is received, route data communication lines corresponding to a second communication protocol to the data port.

In accordance with another aspect of the invention, there is provided a method for controlling a data communication interface for a data port, comprising:

monitoring the status of a power line of the data port and,
if the power line has a first status, transmitting a first communication mode instruction to route data communication lines corresponding to a first communication protocol to the data port and,
if the power line has a second status, sending a second communication mode instruction to route data communication lines corresponding to a second communication protocol to the data port.

Further features of the invention provide for the step of monitoring the status of a power line of the data port to monitor a voltage of the power line of the data port.

Further features of the invention provide for the power line to have a first status if the voltage is less than a first predetermined threshold and the power line to have a second status if the voltage is greater than a second predetermined threshold.

Further features of the invention provide for the method to include further steps of either receiving a first communication mode instruction and, responsive to which, activating a multiplexer to route data communication lines corresponding to the first communication protocol to the data port; or receiving a second communication mode instruction and, responsive to which, activating a multiplexer to route data communication lines corresponding to the second communication protocol to the data port.

DETAILED DESCRIPTION WITH REFERENCE TO THE DRAWINGS

Many electronic devices, such as monitoring devices for example, are capable of receiving and transmitting data, such as sensor data for example, by using either wireless communications or alternatively a data interface cable which may be connected between the electronic device and an external device, which may be an external electronic device such as a host computer, a sensor probe or any other appropriate external device.

Data communication between the electronic device and external device may oftentimes be "serial communications" which may be either synchronous or asynchronous. Many of these existing serial data communications are defined by communication standards and/or protocols, such as universal serial bus (USB), universal asynchronous receiver/transmitter (UART), inter-integrated circuit serial bus (I2C), recommended standard (RS-232), system management bus (SM-Bus) and serial peripheral interface bus (SPI). Each of these data communication standards or protocols, as the case may be, may have differences making them incompatible with one another in one way or another. For example, USB data communication from a monitoring device to an external device being a host computer is different to I2C data communication between the monitoring device and an external device being a sensor probe.

Figure 1:
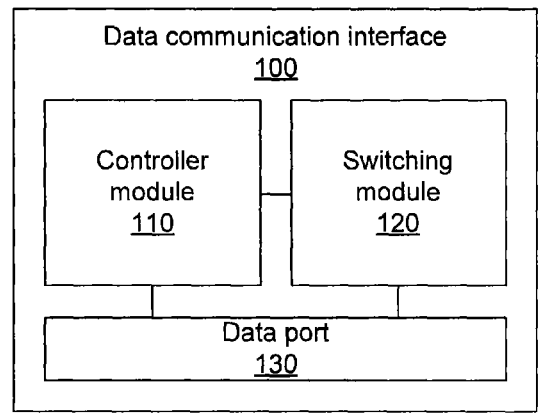
FIG. 1 is a block diagram which illustrates components of a data communication interface according to an embodiment of the invention.

FIG. 1 is a block diagram which illustrates components of a data communication interface (100) according to a first embodiment of the invention. The data communication interface (100) includes a controller module (110), a switching module (120) and a data port (130). The controller module (110), switching module (120) and data port (130) are in electrical communication with each other such that power and/or data signals may be communicated therebetween.

The controller module (110) is operable to monitor a status of a power line of the data port and, if the power line has a first status, to transmit a first communication mode instruction to the switching module (120). If the power line has a second status, the controller module (110) is operable to send a second communication mode instruction to the switching module (120).

Embodiments of the invention anticipate several alternatives in monitoring the status of the power line. In one embodiment, the controller module (110) monitors a voltage of the power line such that the power line has a first status if the voltage is less than a first predetermined threshold and the power line has a second status if the voltage is greater than a second predetermined threshold. The first predetermined threshold may be a lower threshold of an operating voltage of the first communication protocol and the second predetermined threshold may be an operating voltage of the second communication protocol. In some embodiments, the first and second predetermined thresholds may be the same between a lower threshold of an operating voltage of the first communication protocol and an operating voltage of the second communication protocol The lower threshold of the operating voltage of the first communication protocol may be about 2.8 V and the operating voltage of the second communication protocol may be about 5 V.

In another embodiment, the controller module (110) monitors the input or output of power on the power line such that the power line has a first status if power is output on the power line and the power line has a second status if power is received on the power line.

In yet another embodiment of the invention, the controller module (110) monitors an increase or decrease in voltage of the power line such that the power line has a first status if the voltage is decreased and the power line has a second status if the voltage increased. For example, an increase in voltage on the power line may correspond to a connection of an external device being a powered device to the data port. Similarly, a decrease in voltage on the power line may correspond to a removal of the external device being a powered device from the data port.

The switching module (120) is configured to receive a communication mode instruction from the controller module (110) being either a first communication mode instruction or a second communication mode instruction. If the first communication mode instruction is received, the switching module (120) is configured to route data communication lines (106) corresponding to a first communication protocol to the data port (130). If, on the other hand, the second communication mode instruction is received, the switching module (120) is configured to route data communication lines (108) corresponding to a second communication protocol to the data port.

The data port (130) includes a number of pins which may be used to communicate data signals and/or power signals between the data communication interface (100) and an external device. The data port may include a connector or socket for receiving a corresponding connector of the external device or may alternatively provide pins onto which wires of the external device may be soldered. In some embodiments, the data port includes four wires being a power line, two data lines, and a ground line. Embodiments further provide for the data port to include an interrupt line and/or a USB identifier (ID) line. In some embodiments, the interrupt line and ID line share a common line.

Figure 2:
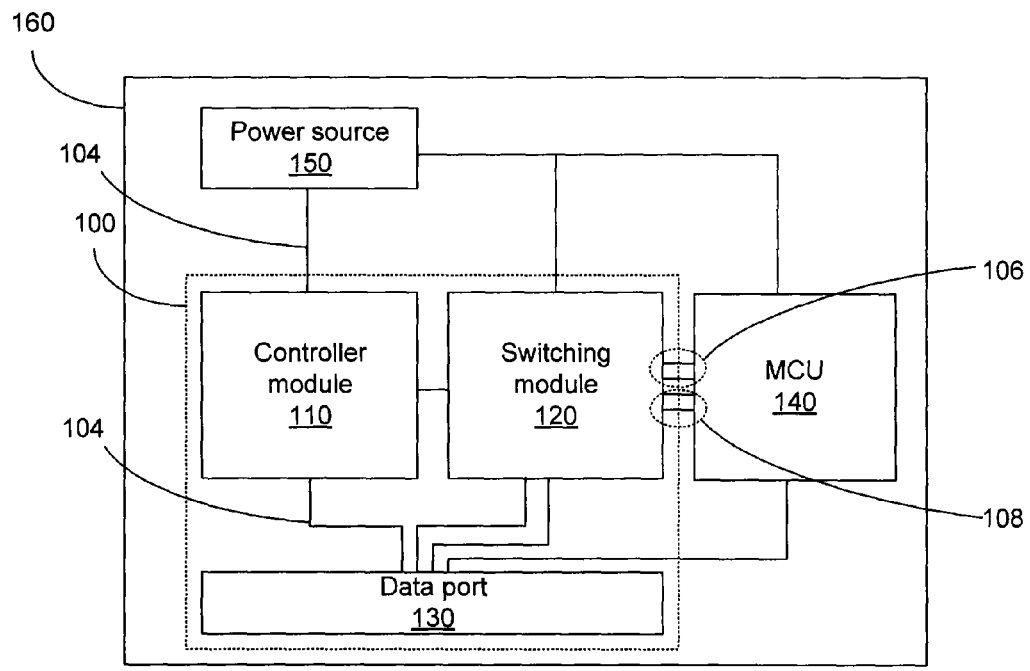
FIG. 2 is a block diagram which illustrates components of a data communication interface as integrated into a monitoring device according to embodiments of the invention.

FIG. 2 is a block diagram which illustrates components of a data communication interface (100) according to embodiments of the invention which are integrated into a monitoring device (160). The components may be provided on the same printed circuit board of the monitoring device, or on a separate printed circuit board which is included in the monitoring device (160) and electrically coupled thereto.

The monitoring device (160) at least includes a power source (150) and a microcontroller (MCU) (140). The power source (150) provides electrical power to one or more of the controller module (130), the switching module (120), the data port (130) and the MCU (140). The MCU (140) is in electrical communication with at least the switching module (120) as well as the data port (130). In some embodiments of the invention, the monitoring device (160) may further include a communication module and optionally an antenna for communicating in a wired or wireless manner with other appropriate electronic devices. The monitoring device (160) may further include a display screen on which information may be displayed, as well as an input component, such as one or more buttons, via which information may be input into the monitoring device (160).

The monitoring device (160) in the illustrated embodiment may be any appropriate monitoring device and is configured to interface to, and communicate with, at least two different types of external devices via the data communication interface (100). The different types of external devices may utilise different communication standards and consequently may communicate data using different communication protocols. Depending on the external device which is connected to the data port (130) and the communication protocol to be used, the monitoring device may act as a slave device or as a host, or master device. Furthermore, depending on the external device which is connected to the data port (130) and the communication protocol to be used, the monitoring device may provide, or output, electrical power to the external device. Alternatively, a different external device, once connected to the monitoring device via the data port (130), may provide, or input, electrical power to the monitoring device (160). It may often be the case, in applications anticipated by embodiments of the invention, that the electrical power input by the external device is greater than the electrical power output by the power source (150). Furthermore, it may often be the case that external devices inputting electrical power to the monitoring device (160) may utilise one communication standard, whilst those external devices to which electrical power is output by the monitoring device (160), may utilise another, different communication standard.

For example, a first external device, which may be an external peripheral device, may utilize a first communication mode and require electrical power from the monitoring device (160). A second external device, which may be an external powered device, on the other hand, may utilize a second communication protocol and may provide electrical power to the monitoring device (160).

The term "monitoring device" is used generically throughout this specification and may refer to any of a number of appropriate electronic devices. In one embodiment, the monitoring device is an asset monitoring device which may be configured to monitor one or more parameters associated with an object. Such a monitoring device may have one or more sensor probes attached thereto via a data port according to embodiments of the invention and may alternatively interface to a computing device via the same data port.

Electrical power output by the monitoring device may be supplied by the power source (150) of the monitoring device (160). Electrical power input to the monitoring device (160) from an external device may be used to replenish the power source (150). As such, a power line (104) is provided between the power source (150) and the data port (130) via which electrical power may be input from, or output to, an external device. In some embodiments, the controller module (110) and switching module (120) are defaulted to a first communication mode. As such, the switching module (120) is by default configured to route data communication lines corresponding to a first communication protocol to the data port (130). Similarly, a voltage which is typically between 2.8 and 3.3 V, is applied by default to the power line (104) by the power source (150). Thus an external device, not having its own power source may be connected to the data port and, upon connection, may receive electrical power from the power source (150) via the data port (130).

Should an external device be connected to the data port, in addition to providing electrical power, the monitoring device (160) is further configured to send and receive data signals to the external device via the data port (130). The data signals may be sent to the microcontroller (140) from the external device via the data port (130) and switching module (120), or vice versa. Depending on the communication standards being utilized by the external device, different input/output (I/O) pins of the MCU (140) may be required.

In the illustrated embodiment, the power line (104) is monitored by the controller module (110) at a point between the data port (130) and the power source (150) of the monitoring device (160). In an exemplary embodiment, the controller module (110) is implemented as a comparator which may, for example have a reference voltage being received from the power source and an input voltage being received from the power line (104).

It is anticipated that a voltage corresponding to the electrical power output by the power source (150) to the data port may be less than the voltage corresponding to the electrical power input to the monitoring device (160) by the external device via the data port (130). Thus, by configuring the controller module (110) to monitor a voltage of the power line (104), the controller module (110) is operable to determine whether or not the voltage of the power line (104) is greater than, or less than a predetermined threshold. By setting the predetermined threshold in-between an expected voltage corresponding to the electrical power output by the power source (150) and an expected voltage corresponding to the electrical power input to the monitoring device (160), the controller module may be operable to determine whether a first external device or a second external is connected to the data port.

In some embodiments of the invention, the predetermined threshold is an internal reference voltage which is compared to the voltage of the power line (104). If the voltage of the power line (104) is greater than the predetermined threshold a second communication mode instruction is transmitted to the switching device. If the voltage on the power line (104) is lower than the predetermined threshold, a first communication mode instruction is transmitted to the switching device. There is a small voltage hysteresis when switching so that a control pin of the controller module does not oscillate.

Embodiments of the invention anticipate the predetermined threshold to be a voltage greater than 2.8 V and less than 5 V. It may sometimes be the case that the voltage of the power line (104) is the same as the first or second predetermined threshold. In such a case the controller module (110) may be configured to either output a first communication mode instruction or a second communication mode instruction.

Should the status of the power line (104) monitored by the controller module (110) be a first status, which may in turn correspond to a first external device being connected to the data port (130), the controller module (110) is configured to send a first communication mode instruction to the switching module (120) via, for example, a control pin. Should the status of the power line (104) monitored by the controller module (110) be a second status, which may in turn correspond to a second external device being connected to the data port (130), the controller module (110) is configured to send a second communication mode instruction to the switching module (120) via the control pin. The first communication mode instruction may be a logic high, or 1, while the second communication mode instruction may be a logic low, or 0. In other embodiments, the first communication mode instruction may be a logic low, or 0, while the second communication mode instruction may be a logic high, or 1.

The switching module (120), which in some embodiments includes a multiplexer, receives the communication mode instruction from the controller module (110) and routes communication lines to the data port (130) accordingly. For example, if a first communication mode instruction is received, the switching module (120) routes data communication lines corresponding to a first communication protocol to the data port (130). If a second communication mode instruction is received, the switching module (120) routes data communication lines corresponding to a second communication protocol to the data port (130). In some embodiments of the invention, the communication lines corresponding to the first communication protocol include a serial data line and a serial clock line which may be in electrical communication with corresponding pins of the MCU (140). Similarly, in some embodiments of the invention, the communication lines corresponding to the second communication protocol include a data plus line and a data minus line which may be in electrical communication with corresponding pins of the MCU (140).

In some embodiments, the data communication lines corresponding to a first communication protocol are inter-integrated circuit (I2C) data communication lines which include a serial data (SDA) line and a serial clock (SCL) line. In other embodiments, the data communication lines corresponding to a first communication protocol are system management bus (SMBus) data communication lines which include a serial data (SDA) line and a serial clock (SCL) line. Embodiments of the invention similarly provide for the data communication lines corresponding to the second communication protocol to be universal serial bus (USB) communication lines and for the USB data communication lines to be data plus (D+) and data minus (D−) lines.

Embodiments of the invention accordingly provide a monitoring device (160) which is operable to communicate with an external device either using the USB data communication protocol or the I2C data communication protocol via a common data port (130). Embodiments further provide for the monitoring device to act as a peripheral device when communicating with an external device using the USB data communication protocol and as a master node when communicating with an external device using the I2C data communication protocol. In some embodiments of the invention, the data port provides a mini- or micro-USB type socket or port.

For example, an interface circuit for a USB data communication protocol of a peripheral electronic device, such as a monitoring device acting as a USB slave device, usually incorporates a mini- or micro-USB port that has 5 wires/pins. Pin 1 is the VCC, or Vbus input, power pin, pin 2 is the D− data pin, pin 3 is the D+ data pin, pin 4 is the ID pin, and pin 5 is the GND ground pin. The data pins 2 and 3 are generally specifically interfaced for USB protocol and will typically not recognize any other serial data communication. Pin 1 is typically used to provide a +5.0V input voltage which may be used to power the monitoring device, or to recharge the power source.

An interface circuit for an I2C data communication protocol of an external device, such as an external peripheral device which may connect to the monitoring device, usually consists of 4 wires. However for more complex external devices, for example having multiple integrated circuits connected to a common I2C bus, an interrupt or wake-up line/pin may also be provided. Therefore embodiments of this invention anticipate the use of 5 pins for the I2C data communication protocol which include a power pin of +2.8V to +3.3V, a SCL clock pin, a SDA data pin, an interrupt/wake-up pin as well as a GND ground pin. In embodiments of the invention, both the USB data communication protocol and the I2C data communication protocol may interface with external devices via common data port (130), which may include a mini- or micro- USB connector or any other appropriate connector. Accordingly a standard USB pin layout may be used.

Some USB devices, such as those supporting USB on-the-go (OTG), may include an ID line. For example, USB devices having a type A connector, typically only make use of four lines. Pin 4, or the ID pin, in such devices is connected to the ground (pin 5). Accordingly in some embodiments the USB ID line is not utilised by the monitoring device (160). A pin on the data port (130), which would correspond to an ID pin of an external USB device, is connected to an interrupt pin of the MCU (140). In alternative embodiments, the interrupt/ID line from the data port (130) may be multiplexed by the switching module (120) to appropriate pins on the MCU depending on whether a first or second communication mode instruction is received. For example, if a first communication mode instruction is received, the switching module, which may accordingly include a 3:6 multiplexer, switches the interrupt/ID line from the data port (130) to an interrupt pin on the MCU (140). If a second communication mode instruction is received, the switching module switches the interrupt/ID line from the data port (130) to a USB ID pin on the MCU (140).

Figure 3:
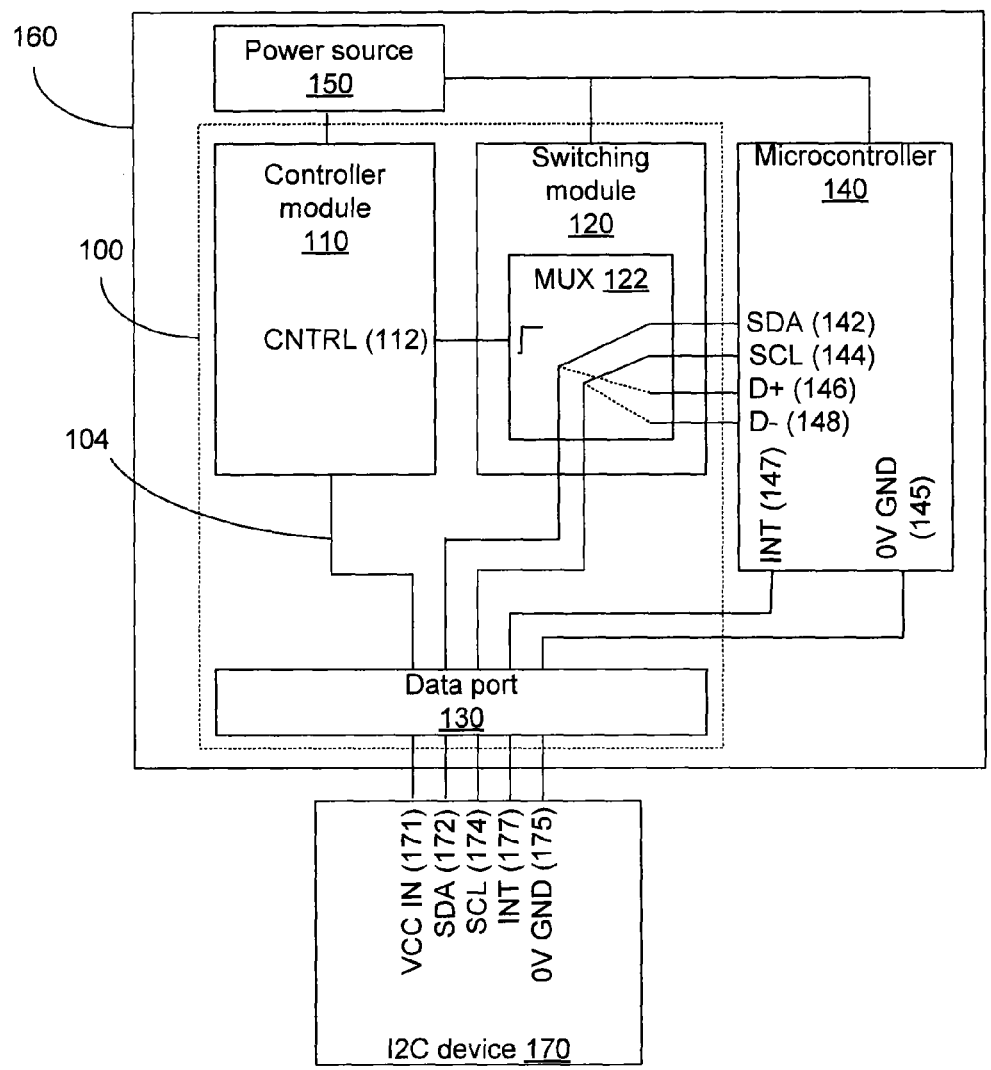
FIG. 3 is a block diagram which illustrates an I2C device being connected to a monitoring device having a data communication interface according to embodiments of the invention.
Figure 4:
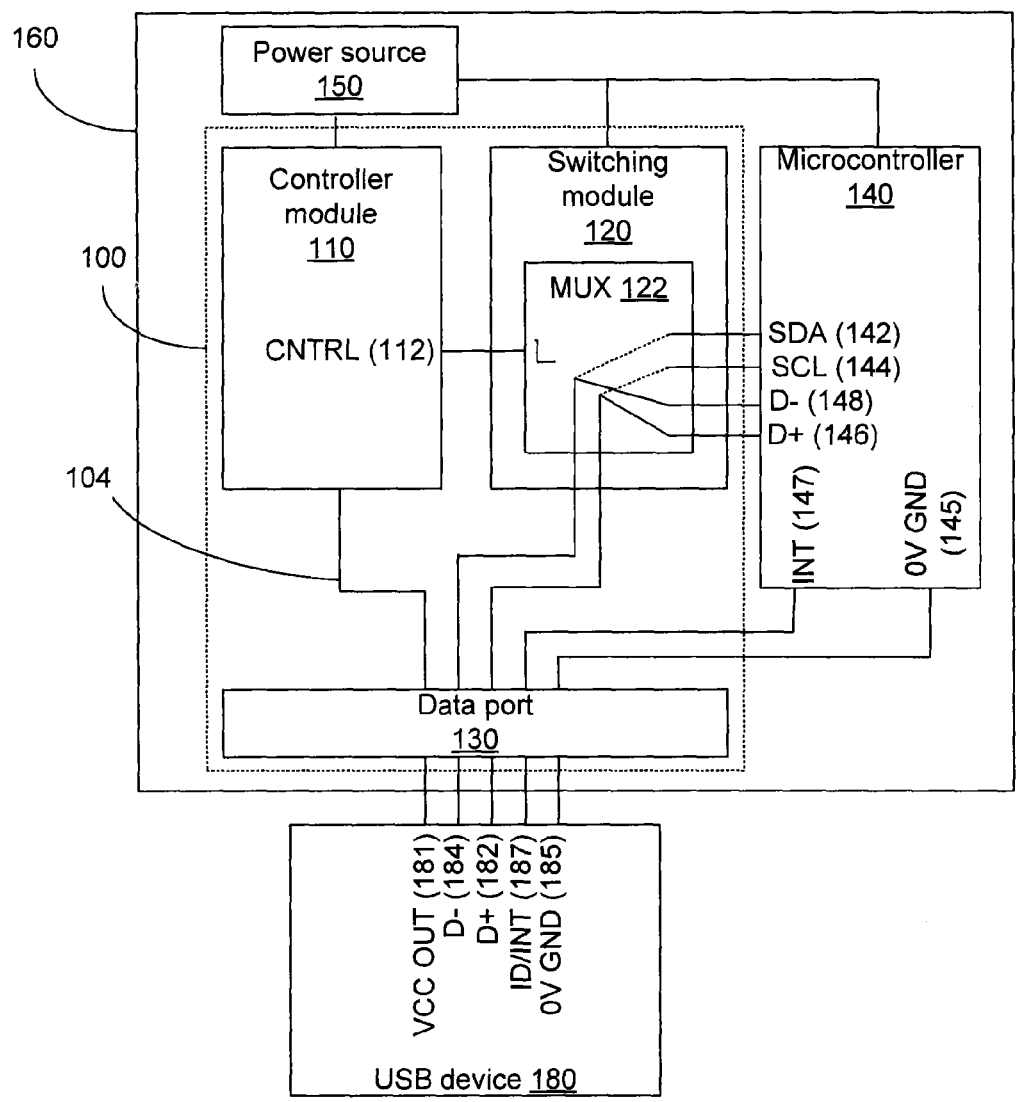
FIG. 4 is a block diagram which illustrates a USB device being connected to a monitoring device having a data communication interface according to embodiments of the invention.
Figure 5:
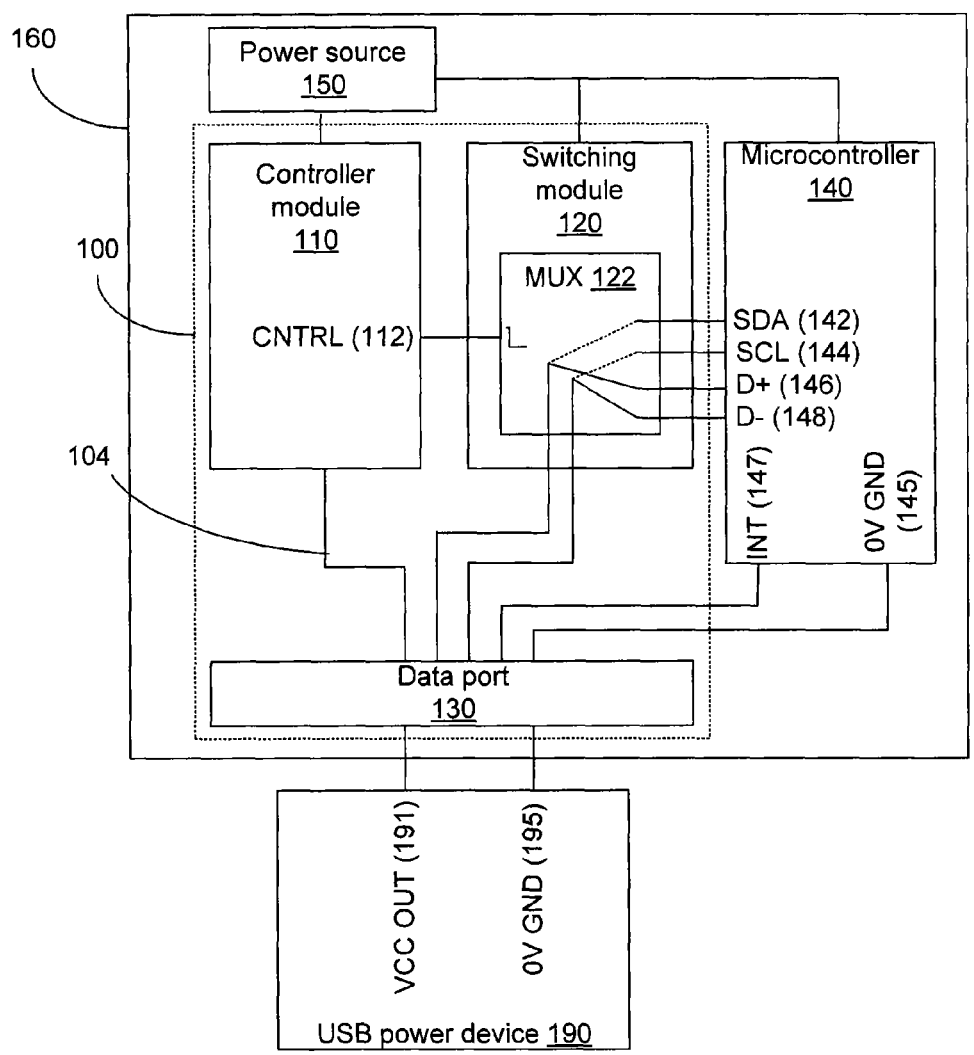
FIG. 5 is a block diagram which illustrates USB power charging device, which does not have data communication lines, being connected to a monitoring device having a data communication interface, according to embodiments of the invention.

FIGS. 3 to 5 are block diagrams which illustrate a monitoring device (160) having a data communication interface (100) according to embodiments of the invention and to which different external devices are connected.

In FIG. 3 the monitoring device (160) according to embodiments of the invention has an external peripheral device being an I2C device (170) connected to the data port (130) and in electrical communication therewith. Such an I2C device (170) corresponds to a first external device as described in the foregoing description in that it does not have its own power source but rather receives power from the monitoring device (160). As such, when the I2C device (170) is connected to the data port (130), a voltage on the power line (104) does not increase beyond the predetermined threshold. The output at the control pin (112) of the controller module (110) is accordingly a logic high. With the voltage of the power line (104) already being below the predetermined threshold and consequently a logic high being received at the multiplexer (122), data communication lines, being I2C data communication lines, are routed by the multiplexer (122) of the switching module (120) to the data port (130).

The I2C data communication lines being routed to the data port (130) include a serial data line in electrical communication with a serial data pin (142) of the MCU (140) and a serial clock line in electrical communication with a serial clock pin (144) of the MCU (140). Thus the serial data pin (142) and the serial clock pin (144) of the MCU (140) are routed by the multiplexer (122), via the data port (130), to a corresponding serial data line (172) and a serial clock line (174) of the I2C device (170). Furthermore, the I2C device receives electrical power at its VCC IN line (171), from the power source (150), and a ground signal at its 0V GND line (175). An interrupt line is also provided between the interrupt pin (147) of the MCU (140) and an interrupt line (177) of the I2C device (170). The monitoring device (160) and 120 device (170) are thereafter able to exchange data via the data communication lines with the monitoring device (160) acting as the I2C master node and the external I2C device (170) acting as the slave node. The I2C device (170) connected to the data port (130) is shown to have a VCC IN line (171) on a pin 1, SDA (172) on a pin 2, SCL (174) on a pin 3, INT (177) on a pin 4, 0V GND (177) on a pin 5 which correspond to pins of the data port. In some embodiments, the SDA and SCL lines may be swapped around such that the SDA line is routed to pin 3 and the SCL line is routed to pin 2. The invention also anticipates that a negative voltage is also provided to the I2C device (170) by the monitoring device (160) via the data port (130).

The data communication interface (100) is configured to output a voltage and route I2C data communication lines to the data port (130) by default. The monitoring device (160) is accordingly configured to act as an I2C master node by default and as a result, the I2C device (170) may receive electrical power and communicate with the monitoring device (160) shortly after being connected to the data port (130) thereof. As connection of the I2C device (170) does not increase the voltage of the power line (104), the controller module (110) does not send a second communication mode instruction to the switching module (120) and the switching module (120) accordingly does not route data communication lines corresponding to a second communication protocol to the data port (130).

The function of an I2C master node is that it uses clock and data I2C lines to communicate with an I2C devices (which may have one or more I2C integrated circuits) using a specific address. Each I2C integrated circuit has a specific, unique address. A master node can be either a transmitter or receiver of data. Because more than one I2C device may share a bus, there is the possibility for any I2C device to have a fault and hang the entire I2C bus. For example if any device holds the SDA line low it may prevent the master node from sending START or STOP commands to reset the bus. Embodiments of the invention provide for the power on the I2C bus to be cycled in order to clear a jammed-up bus. The master node also supplies power to the I2C peripherals which may be <=3.3V. An I2C device, when connected to a master node typically acts as a slave node, and is addressed by the master node. A slave node can be either a receiver or transmitter of data. I2C slave nodes according to embodiments of the invention use a 5 wire cable that includes the SDA and SCL lines, Interrupt/Wake-up line, the 0V Ground, and the input power line.

According to embodiments of the invention, once the I2C device (170), acting as an I2C slave node, is connected to the data port (130) of the monitoring device (160), acting as a master node, the master node supplies a voltage between 2.8V to 3.3V to an I2C bus circuit of the slave node via the power line (104) and data port (130). A communication link is then initiated between the master node and slave node by utilizing the SCL line. The master node may be able to identify specific slave nodes. This may result in "Plug and Play" functionality when the I2C device (170) is plugged into the monitoring device (160), or master node. When the I2C device (170), or slave node, is unplugged from the monitoring device (160), or master node, the I2C data communication lines remain routed to the data port as the power line (104) of the monitoring device (160) remains at <=3.3V.

In FIG. 4 the monitoring device (160) according to embodiments of the invention has an external device being a universal serial bus (USB) device (180) connected to the data port (130) and in electrical communication therewith. Such a USB device (180) corresponds to a second external device as described in the foregoing description in that it does have its own power source. As such, when the USB device (180) is connected to the data port (130), the electrical power supplied by the USB device (180) causes a voltage on the power line (104) to increase above the predetermined threshold. The controller module (110) detects that the voltage on the power line (104) has increased above the predetermined threshold and accordingly outputs a logic low at the control pin (112) of the controller module (110). This logic low is received at the multiplexer (122) which causes the multiplexer (122) of the switching module (120) to route data communication lines, being USB data communication lines, to the data port (130).

The USB data communication lines being routed to the data port (130) include a data plus line in electrical communication with a data plus pin (146) of the MCU (140) and a data minus line is in electrical communication with a data minus pin (148) of the MCU (140). Thus the data plus pin (146) and the data minus pin (148) of the MCU (140) are routed by the multiplexer (122), via the data port (130), to a corresponding data plus line (182) and a data minus pin (184) of the USB device (180). Furthermore, the USB device (180) provides electrical power at its VCC OUT line (181), to the monitoring device (160). The electrical power received by the monitoring device may be used to recharge the power source (150). The USB device (180) also receives a ground signal at its 0V GND line (185) such that all devices have a common ground. The monitoring device (160) and USB device (180) are thereafter able to exchange data via the data communication lines. In the illustrated embodiment, the USB device (180) connected to the data port (130) is shown to have a VCC OUT line (181) on a pin 1, D− (184) on a pin 2, D+(182) on a pin 3, USB ID/INT (187) on a pin 4 and 0V GND (177) on a pin 5 which correspond to pins of the data port. The invention also anticipates that a negative voltage is also supplied to by the USB device (180) to the monitoring device (160) via the data port (130).

The monitoring device (160) may now be recognizable by the USB device (180) as a USB peripheral, and can now receive and transmit USB data to and from the USB device (180). The power line (104) may also have a voltage greater than or equal to 5.0V and this can recharge the power source (150), or to power the monitoring device (160). The USB device (180), acting as a USB host, directs traffic flow and so the monitoring device (160) cannot transfer any data on via the USB data communication protocol without an explicit request from the host controller being the USB device (180). When the USB device (180) is disconnected from the data port (130) of the monitoring device (160), the power line (104) loses the +5V power and the controller module (110) detects that the voltage or power, as the case may be, has dropped below the predetermined threshold and consequently sends a first communication mode instruction to the switching interface which is operable to then route the data communication lines corresponding to the I2C data communication protocol to the data port (130).

In FIG. 5 the monitoring device (160) according to embodiments of the invention has an external device being a universal serial bus (USB) power charging device (190) connected to the data port (130) and in electrical communication therewith. Such a USB power charging device (190) corresponds to a second external device as described in the foregoing description in that it has its own power source. However, the USB power charging device (190) merely provides electrical power and does not provide any data communication lines. As such, when the USB power charging device (190) is connected to the data port (130), the electrical power supplied by the USB power charging device (190) causes a voltage on the power line (104) to increase above the predetermined threshold. The controller module (110) detects that the voltage on the power line (104) has increased above the predetermined threshold and accordingly outputs a logic low at the control pin (112) of the controller module (110). This logic low is received at the multiplexer (122) which causes the multiplexer (122) of the switching module (120) to route data communication lines, being USB data communication lines, to the data port (130).

The USB data communication lines being routed to the data port (130) include a data plus line in electrical communication with a data plus pin (146) of the MCU (140) and a data minus line in electrical communication with a data minus pin (148) of the MCU (140). However, the USB power charging device (180) does not provide any lines for transmitting and receiving data communication signals. The USB power charging device (190) provides electrical power at its VCC OUT line (191), to the monitoring device (160). The electrical power received by the monitoring device may be used to recharge the power source (150). The USB device (180) also transmits/receives a ground signal at its 0V GND line (195) such that all devices have a common ground. When the USB power charging device (190) is disconnected from the data port (130), the voltage power line (104) drops to <=3.3V. This voltage drop is detected by the controller module (110) and, being below the threshold, the controller module (110) sends a first data communication mode instruction is sent to the switching module (120) which causes data communication lines being I2C data communication lines to be routed to the data port (130) by the switching module (120).

Figure 6:
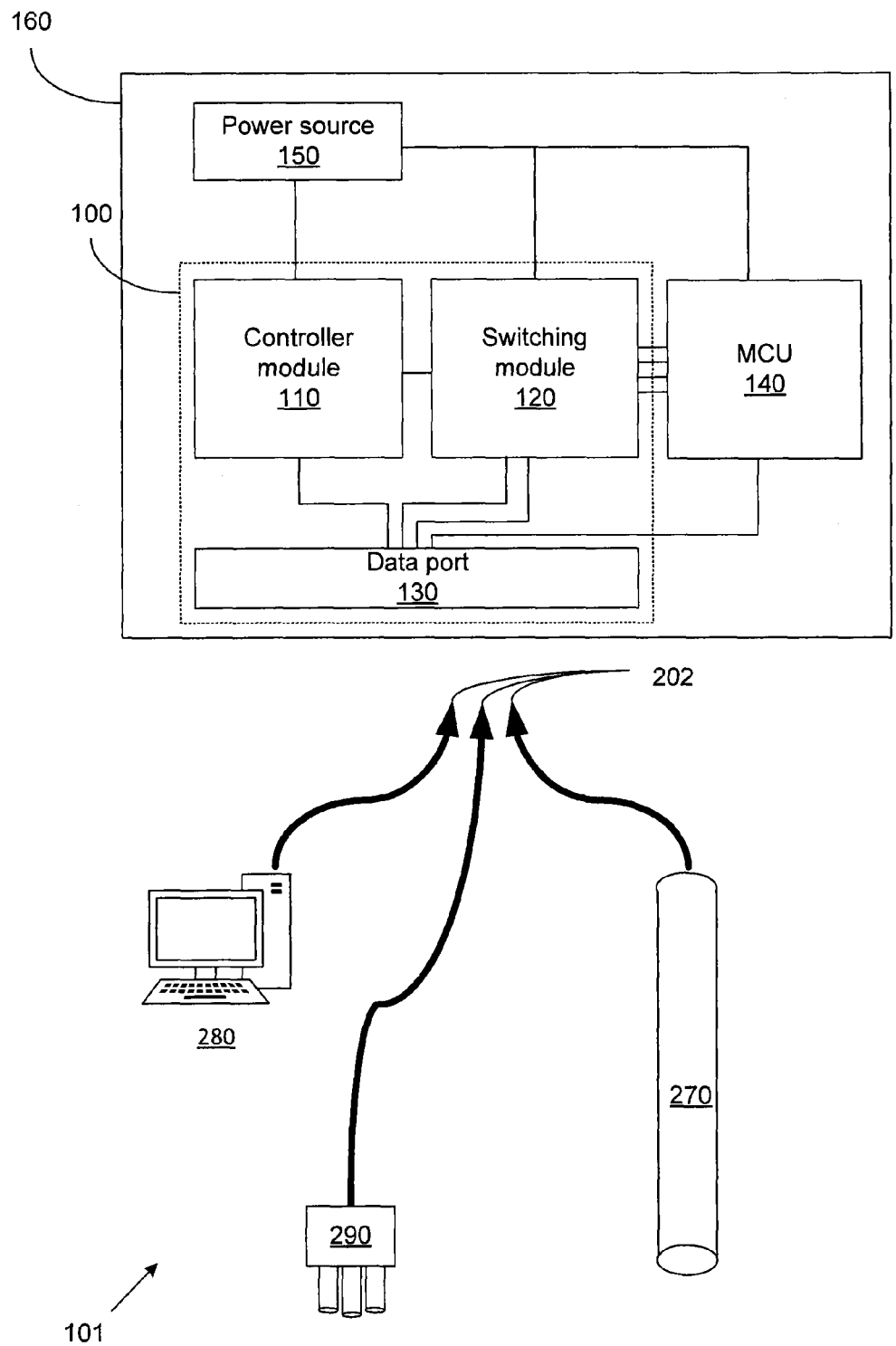
FIG. 6 is a block diagram which illustrates a system including a monitoring device having a data communication interface according to embodiments of the invention and three exemplary external devices.

FIG. 6 is a block diagram which illustrates a system (101) including a monitoring device (160) having a data communication interface (100) according to embodiments of the invention and three exemplary external devices (270, 280 and 290). In the illustrated embodiment, the exemplary devices are a sensor probe (270), which corresponds to a first external device, or external peripheral device, as has been described in the foregoing description, a computing device (280) which corresponds to a second external device, or external powered device, as has been described in the foregoing description and a power supply (290) corresponding to a second external device or a USB power charging device. The exemplary external devices (270, 280 and 290) are all provided with a cable. The cables of exemplary external devices (270, 280 and 290) all have the same type of connector (202) which may be configured to be connected to a corresponding connector or socket of the data port (130) of the monitoring device (160). Thus exemplary external devices (270, 280 and 290) may be interchangeably connected to the data port (130). The controller module (110) of the data communication interface (100) is configured to route data communication lines to the data port data depending on which external device is connected to the data port (130). The first external device (270) or second external device (280), whichever is connected to the data port (130), may thus communicate data with the monitoring device using a corresponding data communication protocol or standard specific to that device. The second external device being the USB power charging device (290) is not provided with data communication lines and accordingly does not communicate data via the data port (130). The USB power charging device (290) only replenishes the power source (150). The monitoring device (160) may thus act as either a host device (or master node) or as a peripheral (or slave) device depending on which of the two devices is connected to the data port (130). Similarly the first external device (270) and second external device (280) may respectively either receive electrical power from, or provide electrical power to the monitoring device (160) via the data port (130), as has been described in the foregoing description.

Figure 7:
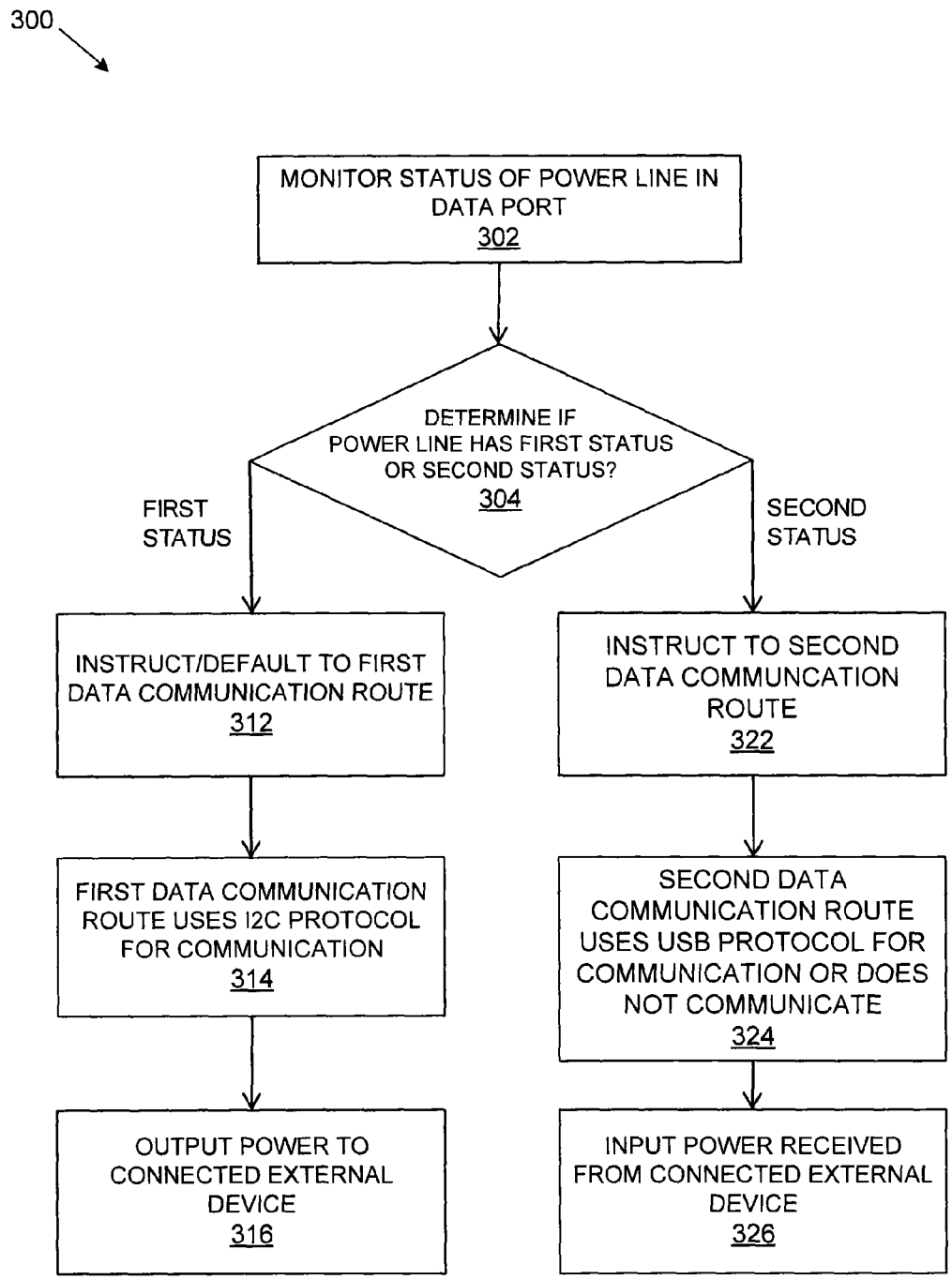
FIG. 7 is a block flow diagram which illustrates a method for controlling a data communication interface for a data port according to embodiments of the invention.

FIG. 7 is a block flow diagram which illustrates a method (300) for controlling a data communication interface for a data port. The method (300) includes a first step (302) of monitoring the status of a power line of the data port.

Embodiments of the invention anticipate various ways in which the status of the power line of the data port may be monitored. For example, monitoring the status of the power line may include monitoring a voltage of the power line. In another embodiment, monitoring the status of the power line includes monitoring the input or output of power on the power line. In yet another alternative embodiment, monitoring the status of the power line includes monitoring an increase or decrease in voltage of the power line.

The method includes a next step (304) of determining if the power line has a first status or a second status. Depending on which of the three status monitoring embodiments described above is implemented, the power line may have a first status if the voltage is less than a first predetermined threshold and the power line may have a second status if the voltage is greater than a second predetermined threshold. Alternatively, the power line may have a first status if power is output on the power line and the power line may have a second status if power is received on the power line. Or, the power line may have a first status if the voltage is decreased and the power line may have a second status if the voltage increased.

Should it be determined that the power line has a first status, a first branch of steps are executed. In such a first branch, the method includes a step (312) of transmitting a first communication mode instruction to route data communication lines corresponding to a first communication protocol to the data port. In some embodiments, the data communication lines corresponding to a first communication protocol are inter-integrated circuit (I2C) data communication lines which include a serial data line and a serial clock line.

The method includes a following step (314) of receiving a first communication mode instruction and activating a multiplexer to route data communication lines corresponding to a first communication protocol to the data port.

While the status of the power line has a first status, electrical power is continually output (316) to a connected external device via the data port.

If, on the other hand, it is determined that the power line has a second status, a second branch of steps are executed. A first step (322) of such a second branch includes sending a second communication mode instruction to route data communication lines corresponding to a second communication protocol to the data port.

The method then includes a next step (324) of receiving a second communication mode instruction and activating a multiplexer to route data communication lines corresponding to a second communication protocol to the data port. Embodiments of the invention similarly provide for the data communication lines corresponding to the second communication protocol to be universal serial bus (USB) communication lines and for the USB data communication lines to be data plus (D+) and data minus (D−) lines.

While the status of the power line has a second status, electrical power is continually input (326) from a connected external device via the data port.

Embodiments of the invention accordingly provide a data communication interface and an associated method which may allow for a single data port to enable for multiple communication protocols. Different external devices, communicating via different communication protocols or standards, may be connected to and communicate with an electronic device, for example a monitoring device, via a common data port.

Figure 8:
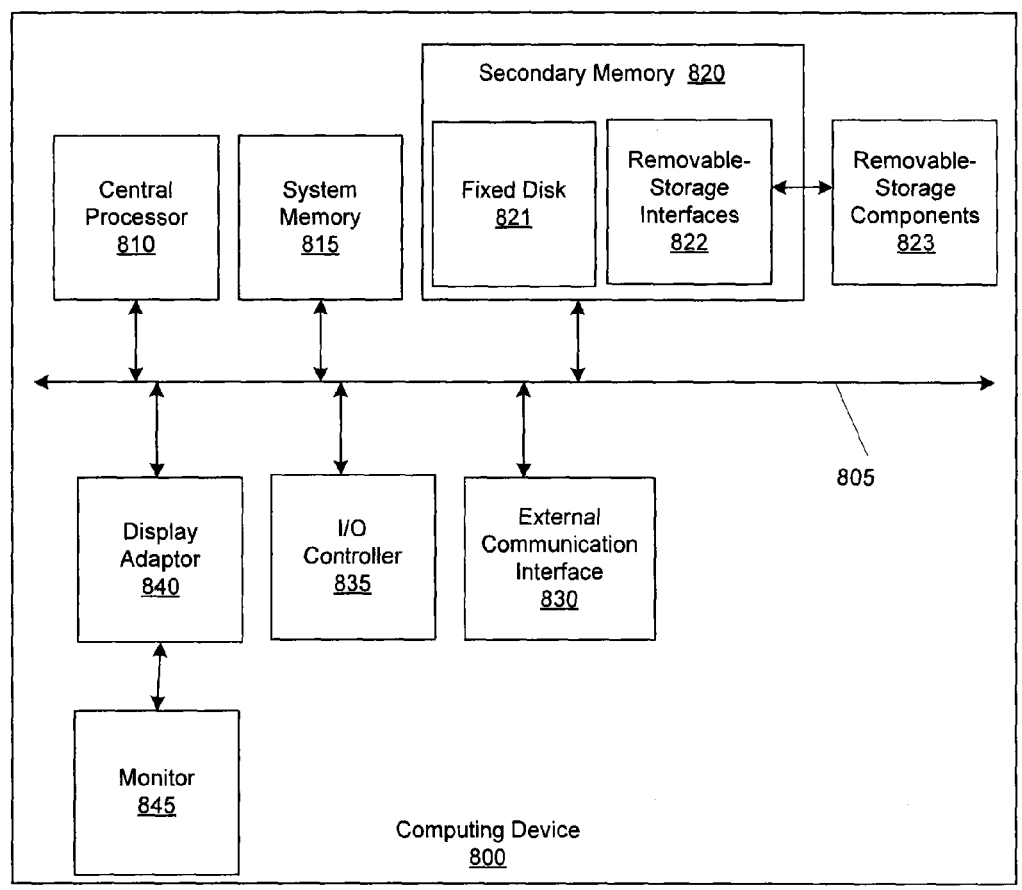
FIG. 8 is a block diagram which illustrates an exemplary computing device in which various aspects of the disclosure may be implemented; and, FIG. 9 is a block diagram which shows an exemplary monitoring device that may be used in embodiments of the disclosure.

FIG. 8 illustrates an example of a computing device (800) in which various aspects of the disclosure may be implemented, such as an external powered device, for example. The computing device (800) may be suitable for storing and executing computer program code. The various participants and elements in the previously described diagrams may use any suitable number of subsystems or components of the computing device (800) to facilitate the functions described herein.

The computing device (800) may include subsystems or components interconnected via a communication infrastructure (805) (for example, a communications bus, a cross-over bar device, or a network). The computing device (800) may include at least one central processor (810) and at least one memory component in the form of computer-readable media.

The memory components may include system memory (815), which may include read only memory (ROM) and random access memory (RAM). A basic input/output system (BIOS) may be stored in ROM. System software may be stored in the system memory (815) including operating system software.

The memory components may also include secondary memory (820). The secondary memory (820) may include a fixed disk (821), such as a hard disk drive, and, optionally, one or more removable-storage interfaces (822) for removable-storage components (823).

The removable-storage interfaces (822) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive.

The removable-storage interfaces (822) may also be in the form of ports or sockets for interfacing with other forms of removable-storage components (823) such as a flash memory drive, external hard drive, or removable memory chip, etc.

The computing device (800) may include an external communications interface (830) for operation of the computing device (800) in a networked environment enabling transfer of data between multiple computing devices (800). Data transferred via the external communications interface (830) may be in the form of signals, which may be electronic, electromagnetic, optical, radio, or other types of signal.

The external communications interface (830) may enable communication of data between the computing device (800) and other computing devices including servers and external storage facilities. Web services may be accessible by the computing device (800) via the communications interface (830).

The external communications interface (830) may also enable other forms of communication to and from the computing device (800) including, voice communication, near field communication, Bluetooth, etc.

The computer-readable media in the form of the various memory components may provide storage of computer-executable instructions, data structures, program modules, and other data. A computer program product may be provided by a computer-readable medium having stored computer-readable program code executable by the central processor (810).

A computer program product may be provided by a non-transient computer-readable medium, or may be provided via a signal or other transient means via the communications interface (830).

Interconnection via the communication infrastructure (805) allows a central processor (810) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (800) either directly or via an I/O controller (835). These components may be connected to the computing device (800) by any number of means known in the art, such as a serial port.

One or more display screens or monitors (845) may be coupled via a display or video adapter (840) to the computing device (800).

Figure 9:
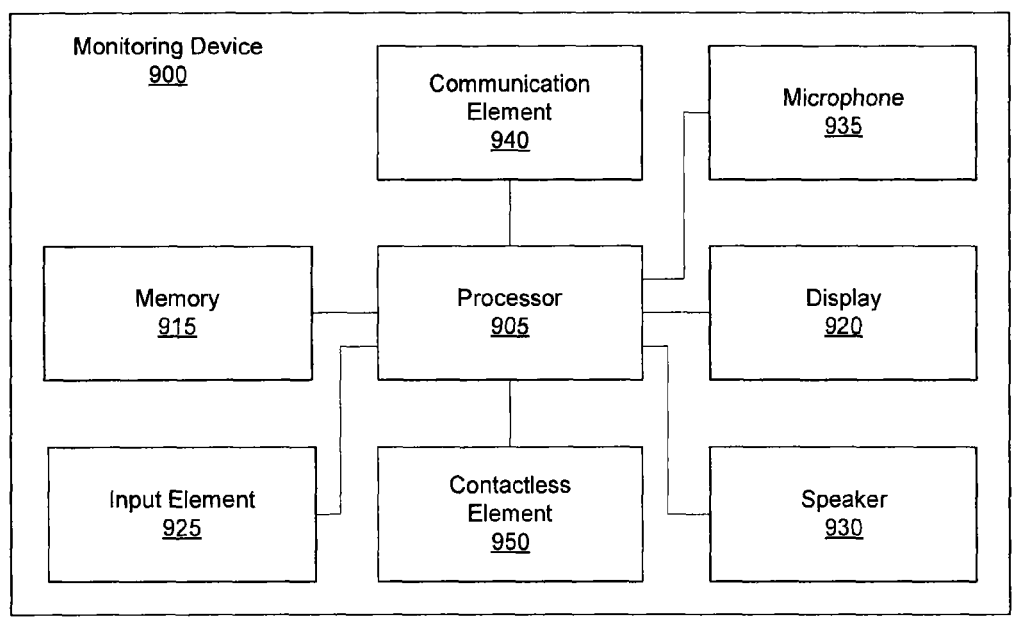

FIG. 9 shows a block diagram of a monitoring device (900) that may be used in embodiments of the disclosure. Exemplary monitoring devices include a mobile phone such as a smart phone, feature phone; any appropriate microcontroller device which may interface with one or more external devices acting as either a slave or a host device; any appropriate electronic device which may interface with one or more external devices acting as either a slave or a host device; a computing device such as a laptop computer, desktop computer, tablet computer; a gaming console, such as a Sony® PlayStation® or the like; a digital camera; or any other appropriate monitoring device which may or may not have a phone capability.

The monitoring device (900) may include a processor (905) (e.g., a microprocessor) for processing the functions of the monitoring device (900) and a display (920) to allow a user to see the phone numbers and other information and messages. The monitoring device (900) may further include an input element (925) to allow a user to input information into the device (e.g., input buttons, touch screen, etc.), a speaker (930) to allow the user to hear voice communication, music, etc., and a microphone (935) to allow the user to transmit his or her voice through the monitoring device (900).

The processor (910) of the monitoring device (900) may connect to a memory (915). The memory (915) may be in the form of a computer-readable medium that stores data and, optionally, computer-executable instructions.

The monitoring device (900) may also include a communication element (940) for connection to communication channels (e.g., a cellular telephone network, data transmission network, Wi-Fi network, satellite-phone network, Internet network, Satellite Internet Network, etc.). The communication element (940) may include an associated wireless transfer element, such as an antenna.

The communication element (940) may include a subscriber identity module (SIM) in the form of an integrated circuit that stores an international mobile subscriber identity and the related key used to identify and authenticate a subscriber using the monitoring device (900). One or more subscriber identity modules may be removable from the monitoring device (900) or embedded in the monitoring device (900).

The monitoring device (900) may further include a contactless element (950), which is typically implemented in the form of a semiconductor chip (or other data storage element) with an associated wireless transfer element, such as an antenna. The contactless element (950) may be associated with (e.g., embedded within) the monitoring device (900) and data or control instructions transmitted via a cellular network may be applied to the contactless element (950) by means of a contactless element interface (not shown). The contactless element interface may function to permit the exchange of data and/or control instructions between mobile device circuitry (and hence the cellular network) and the contactless element (950).

The contactless element (950) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the monitoring device (900) and an interrogation device. Thus, the monitoring device (900) may be capable of communicating and transferring data and/or control instructions via both a cellular network and near field communications capability.

The data stored in the memory (915) may include: operation data relating to the operation of the monitoring device (900), parameters sensed by associated sensors of the monitoring device, events detected by associated sensors of the monitoring device, personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the monitoring device (900) to selected receivers.

The monitoring device (900) may be, amongst other things, a notification device that can receive alert messages and access reports, a portable merchant device that can be used to transmit control data identifying a discount to be applied, as well as a portable consumer device that can be used to make payments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A data communication interface comprising a controller module, a switching module and a data port, wherein:
   the controller module is operable to monitor a status of a power line of the data port and, if the power line has a first status, transmit a first communication mode instruction to the switching module and, if the power line has a second status, transmit a second communication mode instruction to the switching module;
   the switching module is configured to receive a communication mode instruction from the controller module and, if the first communication mode instruction is received, route inter-integrated circuit (I2C) data communication lines to the data port; and, if the second communication mode instruction is received, route universal serial bus (USB) data communication lines to the data port, and
   wherein the data communications interface is thus configurable for data communication via the data port with an external device using an I2C data communication protocol, and configurable for data communication via the data port with an external device using a USB data communication protocol, and
   wherein the controller module, the switching module, and the data port are electrically coupled to a printed circuit board of a monitoring device that includes a power source and a microcontroller.

2. The data communication interface according to claim 1, wherein monitoring the status of the power line monitors a voltage of the power line.

3. The data communication interface according to claim 2, wherein the power line has a first status if the voltage is less than a first predetermined threshold and the power line has a second status if the voltage is greater than a second predetermined threshold.

4. The data communication interface according to claim 3, wherein the first predetermined threshold corresponds to an operating voltage of the I2C data communication protocol and the second predetermined threshold corresponds to an operating voltage of the USB data communication protocol.

5. The data communication interface according to claim 3, wherein the first and second predetermined thresholds are the same between an operating voltage of the I2C data communication protocol and an operating voltage of the USB data communication protocol.

6. The data communication interface according to claim 1, wherein if the power line has a first status and the switching module routes I2C data communication lines, the power line of the data port is configured to supply power to an external device; and if the power line has a second status and the switching module routes USB data communication lines, the power line of the data port is configured to receive power from an external device.

7. The data communication interface according to claim 1, wherein if the power line has a second status and the switching module routes USB data communication lines to the data port, the data communication lines are not used and only power is received via the data port.

8. The data communication interface according to claim 6, wherein if the power line is configured to receive power from an external device, using the received power to power and/or charge a power source of a host of the data communication interface.

9. The data communication interface according to claim 1, wherein the first communication mode instruction is a logic high and the second communication mode instruction is a logic low or wherein the first communication mode instruction is a logic low and the second communication mode instruction is a logic high.

10. The data communication interface according to claim 1, wherein the switching module is a multiplexer.

11. The data communication interface according to claim 1, wherein the I2C data communication lines include a serial data line, a serial clock line and optionally an interrupt line.

12. The data communication interface according to claim 1, wherein the USB data communication lines include data plus (D+) and data minus (D−) lines, and wherein wires of the data port include a power line, two data lines, and a ground line and optionally an additional line.

13. The data communication interface according to claim 12, wherein the two data lines are in electrical communication with a serial data line and a serial clock line when the switching module is in the first communication mode and wherein the two data lines are in electrical communication with a data plus line and a data minus line when the switching module is in the second communication mode.

14. The data communication interface according to claim 1, wherein the switching module has a default setting to route I2C data communication lines to the data port.

15. A monitoring device having one or more sensors associated therewith for monitoring one or more parameters, the monitoring device comprising a data communication interface comprising a controller module, a switching module and a data port, wherein:
   the controller module is operable to monitor a status of a power line of the data port and, if the power line has a first status, transmit a first communication mode instruction to the switching module and, if the power line has a second status, transmit a second communication mode instruction to the switching module; and,
   the switching module is configured to receive a communication mode instruction from the controller module and, if the first communication mode instruction is received, route inter-integrated circuit (I2C) data communication lines to the data port; and, if the second communication mode instruction is received, route universal serial bus (USB) data communication lines to the data port, and
   wherein the data communications interface is thus configurable for data communication via the data port with an external device using an I2C data communication protocol, and configurable for data communications via the data port with an external device using a USB data communication protocol, and
   wherein the controller module, the switching module, and the data port are electrically coupled to a printed circuit board of a monitoring device that includes a power source and a microcontroller.

16. A method for controlling a data communication interface for a data port, comprising the step of:
   monitoring the status of a power line of the data port and, if the power line has a first status, transmitting a first communication mode instruction to route inter-integrated circuit (I2C) data communication lines to the data port and, if the power line has a second status, transmitting a second communication mode instruction to route universal serial bus (USB) data communication lines to the data port, wherein the data communications interface is thus configurable for data communication via the data port with an external device using an I2C data communication protocol, and configurable for data communication via the data port with an external device using a USB data communication protocol, and wherein the data port is electrically coupled to a printed circuit board of a monitoring device that includes a power source and a microcontroller.

17. The method according to claim 16, wherein the step of monitoring the status of a power line of the data port monitors a voltage of the power line of the data port.

18. The method according to claim 17, wherein the power line has a first status if the voltage is less than a first predetermined threshold and the power line has a second status if the voltage is greater than a second predetermined threshold.

19. The method according to claim 16, wherein the method includes further steps of either receiving a first communication mode instruction and, responsive to which, activating a multiplexer to route I2C data communication lines to the data port; or, receiving a second communication mode instruction and, responsive to which, activating a multiplexer to route USB data communication lines to the data port.

* * * * *